US008059153B1

(12) United States Patent
Barreto et al.

(10) Patent No.: US 8,059,153 B1
(45) Date of Patent: Nov. 15, 2011

(54) THREE-DIMENSIONAL OBJECT TRACKING USING DISTRIBUTED THIN-CLIENT CAMERAS

(75) Inventors: Daniel Barreto, Stanford, CA (US); Curt Schwebke, San Jose, CA (US)

(73) Assignee: Wyse Technology Inc., San Jose, CA (US)

( * ) Notice: Subject to any disclaimer, the term of this patent is extended or adjusted under 35 U.S.C. 154(b) by 1459 days.

(21) Appl. No.: 10/871,046

(22) Filed: Jun. 21, 2004

(51) Int. Cl.
*H04N 5/225* (2006.01)
(52) U.S. Cl. ........................................ 348/169
(58) Field of Classification Search .................... 709/203
See application file for complete search history.

(56) References Cited

U.S. PATENT DOCUMENTS

| | | | | |
|---|---|---|---|---|
| 5,710,875 | A | 1/1998 | Harashima et al. | 345/419 |
| 6,363,320 | B1 | 3/2002 | Chou | 701/207 |
| 6,532,022 | B1 * | 3/2003 | Ahmad | 345/629 |
| 6,584,404 | B1 * | 6/2003 | McBurney et al. | 701/213 |
| 7,142,726 | B2 * | 11/2006 | Ziegler et al. | 382/285 |
| 2002/0167594 | A1 | 11/2002 | Sumi et al. | 348/208.14 |
| 2003/0002712 | A1 | 1/2003 | Steenburgh et al. | 382/103 |
| 2003/0020808 | A1 | 1/2003 | Luke et al. | 348/47 |
| 2003/0095186 | A1 | 5/2003 | Aman et al. | 348/162 |
| 2003/0163289 | A1 | 8/2003 | Whelan et al. | 702/188 |
| 2004/0017929 | A1 | 1/2004 | Bramblet et al. | 382/103 |
| 2004/0118922 | A1 * | 6/2004 | Murata et al. | 235/454 |
| 2004/0183915 | A1 * | 9/2004 | Gotohda et al. | 348/207.11 |
| 2007/0279494 | A1 * | 12/2007 | Aman et al. | 348/169 |

OTHER PUBLICATIONS

Dirk Frocken, Towards Vission-based 3-D People Tracking in a Smart Room, Oct. 2002.*
Jason Luck, Development and Analysis of a Real-Time Human Motion Tracking System, 2002.*
Arun Hampapur, Smart Surveillance: Applications, Technologies and Implications, 2003.*
Luck et al., "Development and Analysis of a Real-Time Human Motion Tracking System," 2002.*
C. Stauffer and W. Grimson, "Adaptive Background Mixture Models for Realtime Tracking," 1998.*
D. Beymer and K. Konolig, "Real-Time Tracking of Multiple People Using Continuous Detection", Proceedings of the International Conference on Computer Vision (ICCV '99), 1999.
D. Frocken and R. Stiefelhagen, Towards Vision-based 3-D People Tracking in a Smart Room:, Proceedings of the 2002 International Conference on Multimodal Interface (ICMI '02), Oct. 2002.
S. McKenna, S. Jabri, Z, Duric and H. Wechsler, "Tracking Interacting People", IEEE International Conference on Automatic Face fj Gesture Recognition, pp. 348-353, 2000.

(Continued)

*Primary Examiner* — Nhon Diep
(74) *Attorney, Agent, or Firm* — McDermott Will & Emery LLP

(57) ABSTRACT

An object tracking system which includes a plurality of camera devices, each of which captures image data, a plurality of thin-client processors, each of which is connected to a respective camera device via a local connection, each thin-client processor hosting a thin-client application that processes the captured image data to obtain two-dimensional foreground region information by using a background subtraction algorithm, and a server hosting an object tracking application that receives the foreground region information from each thin-client processor via a network and generates a three-dimensional visual hull corresponding to each foreground region represented in the received foreground region information, wherein the object tracking application generates identification and position data corresponding to each three-dimensional visual hull. The thin-client application uses two-dimensional object tracking to identify each object in the foreground region information, and sends each object identity to the object tracking application with the foreground region information.

21 Claims, 11 Drawing Sheets

OTHER PUBLICATIONS

I. Mikic, S. Santini and R. Jain, "Tracking Objects in 3D Using Multiple Camera Views", ACCV 2002.

A. Hampapur, L. Brown, J. Connell, S. Pankanti, A.W. Senior, and Y-L Tian, "Smart Surveillance: Applications, Technologies and Implications", IEEE Pacific-Rim Conference on Multimedia, 2003.

J. Luck, C. Debrunner, W. Hoff, Q. He and D. Small, "Development and Analysis of a Real-Time Human Motion Tracking System", IEEE WACV, 2002.

C. Theobalt, M. Magnor and P. Schuler, "Combining 2D Feature Tracking and Volume Reconstruction for Online Video-Based Human Motion Capture", Proceedings of Pacific Graphics 2002, Beijing, China, pp. 96-103.

I. Mikic, M. Trivedi, E. Hunger and P. Cosman, Articulated Body Posture Estimation from Multi-Camera Voxel Data, IEEE International Conference on Computer Vision and Pattern Recognition, Kuai, Hawaii, Dec. 2001.

* cited by examiner

THREE-DIMENSIONAL OBJECT TRACKING USING DISTRIBUTED THIN-CLIENT CAMERAS

BACKGROUND OF THE INVENTION

1. Field of the Invention

The present invention concerns a system for identifying and tracking three-dimensional objects by utilizing a distributed system of thin-clients connected to cameras and a server which creates a three-dimensional visual hull for the objects recorded by the cameras.

2. Description of the Related Art

Typically, object detection using cameras is performed by a single stereo-type camera which sends the image information to a central processor that performs two-dimensional filtering and uses object templates to determine the position of an object. Other known camera systems include the use of multiple cameras wherein the image data from each camera is sent to a central processor that determines foreground centroid coordinate information for each camera and then triangulates the position of each object based on the collective centroid coordinate information.

The foregoing known techniques suffer from the problem of either using only two-dimensional data in the first example, or using only three-dimensional centroid estimates in the second example, both of which are known to result in unreliable object position estimates. In addition, both techniques fail to construct three-dimensional volumes of the objects being tracked to provide a more reliable estimation of the object size and movement relative to the background of the camera image. The aforementioned techniques also often have difficulty when attempting to track multiple objects, especially when the objects are near each other. Finally, the foregoing techniques are processing intensive because they use a central processor for performing all image processing and they are therefore limited in scalability.

SUMMARY OF THE INVENTION

The present invention solves the above problems by providing a distributed system that uses multiple thin-client connected cameras, each of which processes its image data at the thin-client and sends detected foreground image information to a server which then creates a three-dimensional visual hull representing each object based on the detected foreground image information sent from the plurality of thin-clients. Each visual hull is identified and tracked by the server from frame to frame as information is continuously received from the thin-clients.

Specifically, according to one aspect of the invention, an object tracking system is provided for use in a network environment, the object tracking system including a plurality of camera devices, each of which captures image data, a plurality of thin-client processors, each of which is connected to a respective camera device via a local connection, each thin-client processor hosting a thin-client application that receives the captured image data from the respective camera and processes the image data to obtain two-dimensional foreground region information by using a background subtraction algorithm, and a server having a processor that hosts an object tracking application, the object tracking application receiving the foreground region information from each of the plurality of thin-client processors via the network environment and generating a three-dimensional visual hull corresponding to each foreground region represented in the received foreground region information, wherein the object tracking application generates identification and position data corresponding to each three-dimensional visual hull.

Preferably, the background subtraction algorithm determines foreground region information for each foreground region in the captured image data that corresponds to an object by using a background model which is based on an adaptive background estimation algorithm that accounts for illumination level changes. Also, the thin-client application uses two-dimensional object tracking to identify each object in the foreground region information. Each thin-client application is preferably remotely controlled and synchronized by the object tracking application in the server, and sends the foreground region information to the server in response to receiving a request command from the object tracking application in the server. The object tracking application preferably generates each three-dimensional visual hull by using a volume reconstruction algorithm which reconstructs a volume for each foreground region represented in the received foreground region information from the plurality of thin-client applications. The server also periodically updates the background model in each thin-client application to provide for more accurate separation of the foreground regions.

In this manner, the present invention provides an object tracking system for identifying and tracking three-dimensional objects by utilizing a distributed system of thin-client connected cameras and a server which creates a three-dimensional visual hull for each object detected by the cameras. The present invention thereby efficiently and reliably tracks objects by determining two-dimensional foreground regions and tracking objects in the foreground regions at the thin-client application and then determining a three-dimensional volume for each object in the foreground region information at the server level. Accordingly, the system of the present invention is easily scalable and uses two-dimensional object tracking in the thin-clients to reduce the presence of phantom objects which can appear in known tracking systems.

In another aspect of the invention, a thin-client application for processing image data is provided, the thin-client application being hosted in a thin-client processor connected to a camera device via a local connection, the thin client application comprising executable code for performing the steps of receiving captured image data from the camera device, processing the captured image data to obtain two-dimensional foreground region information from the captured image data using a background subtraction algorithm, and sending the foreground region information to a server via a network environment, the server having a processor that hosts an object tracking application which receives the foreground region information from the thin-client application, and from at least one other thin-client application, and which generates a three-dimensional visual hull corresponding to each foreground region represented in the received foreground region information, wherein the object tracking application generates identification and position data corresponding to each three-dimensional visual hull.

Preferably, the background subtraction algorithm determines foreground region information for each foreground region in the captured image data that corresponds to an object by using a background model which is based on an adaptive background estimation algorithm that accounts for illumination level changes. Also, the thin-client application uses two-dimensional object tracking to identify each object in the foreground region information. Each thin-client application is preferably remotely controlled and synchronized by the object tracking application in the server, and sends the foreground region information to the server in response to receiving a request command from the object tracking application in the server. The object tracking application preferably generates each three-dimensional visual hull by using a volume reconstruction algorithm which reconstructs a volume for each foreground region represented in the received foreground region information from the plurality of thin-client applications. The server also periodically updates the background model in each thin-client application to provide for more accurate separation of the foreground regions.

In this manner, the present invention provides a thin-client application for use in an object tracking system for identifying and tracking three-dimensional objects by utilizing a distributed system of thin-client connected cameras and a server which creates a three-dimensional visual hull for each object detected by the cameras. The present invention thereby efficiently and reliably tracks objects by determining two-dimensional foreground regions and tracking objects in the foreground regions at the thin-client application and then determining a three-dimensional volume for each object in the foreground region information at the server level. Accordingly, the thin-client application of the present invention can be used in a system which is easily scalable and which uses two-dimensional object tracking in the thin-clients to reduce the presence of phantom objects which can appear in known tracking systems.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

As mentioned above, the present invention is generally directed to a distributed system which includes multiple thin-client connected cameras that process image data at the thin-client and then send detected foreground image information to a server which then creates a three-dimensional visual hull representing each object based on the collective foreground image information obtained from the plurality of thin-clients.

Figure 1:
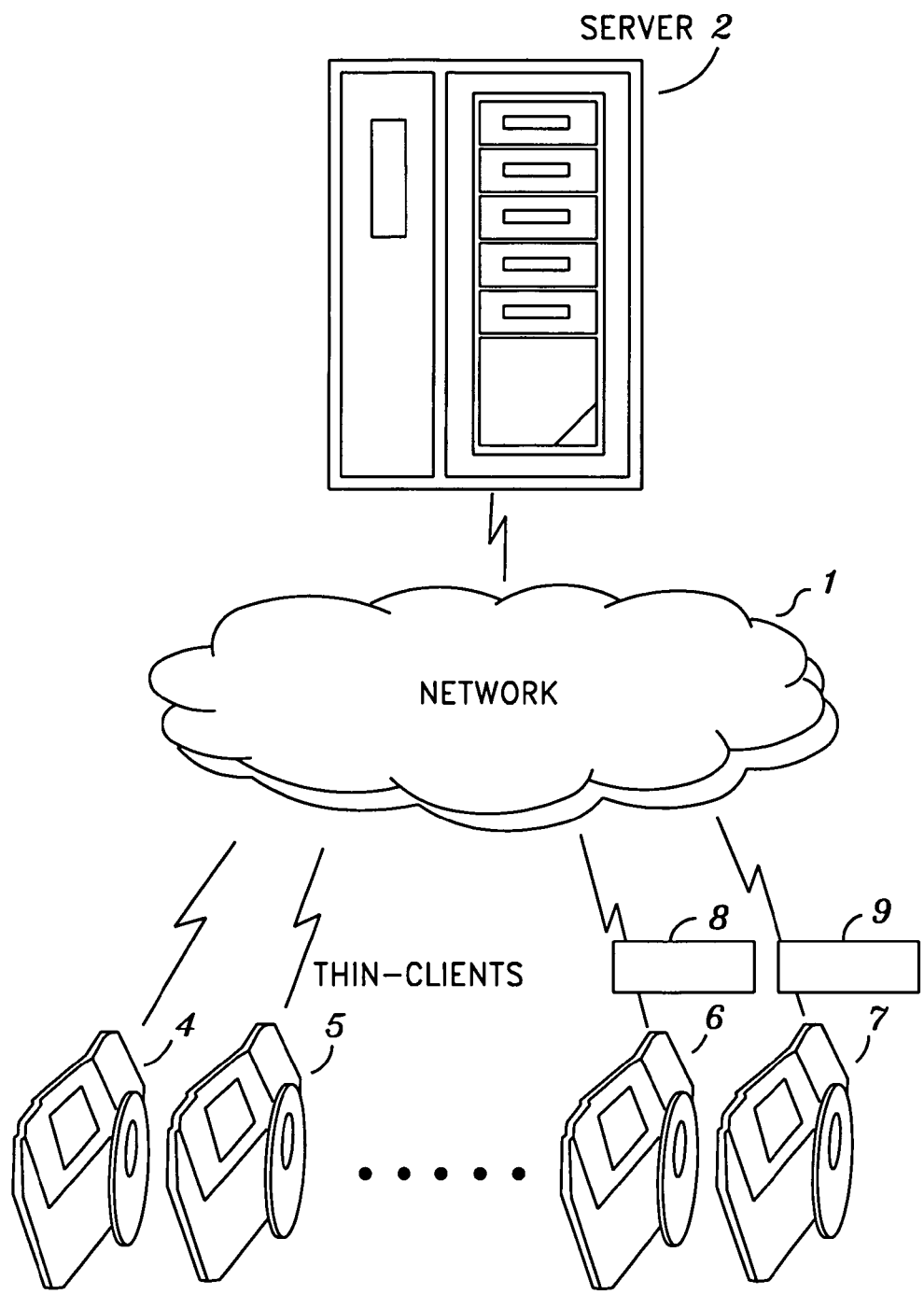
FIG. 1 is a schematic drawing depicting a network environment in which the present application may be practiced according to one embodiment of the invention.

Turning the drawings, FIG. 1 presents a network environment in which the present invention may be practiced. As seen in FIG. 1, the object tracking system of the present invention includes server 2, network 1 and camera devices 4 to 7. Network 1 may be a wired or a wireless LAN or may be the internet. Various types of transport protocol can be used for communication between server 2 and camera devices 4 to 7 via network 1, such as TCP, HTTP, or a custom protocol. If desired, the communication can be performed in a secure manner by also using secure protocols such as IIS, SSL, or a custom secure protocol.

Camera devices 4 to 7 each represent a digital camera which contains a processor and memory, and which has an external connection. As seen in FIG. 1, some camera devices, such as camera devices 4 and 5, may host a thin-client application within their respective processors, and have a network interface for supporting communication via network 1. In the alternative, a camera device in the invention can have an external local connection to a thin-client processor, which is minimized computing device having sufficient memory and processor capacity to host a thin-client application according to the invention. Camera devices 6 and 7 are examples of the latter, and have external local connections to thin-client processors 8 and 9. Of course, only four camera devices are shown in FIG. 1, but the invention is easily scalable so that many more camera devices can also be incorporated into the system. Preferably, each camera device has a wide-angle lens for greater area coverage of the environment in which the particular camera device is positioned. Of course, a camera device having a normal lens, zoom lens, or other type of lens can also be used. Each of camera devices 4 to 7 are locally connected to a thin-client application which executes in a thin-client processor hosted in the camera device (as in camera devices 4 and 5), or provided external to the camera (as in camera devices 6 and 7), to receive captured image data on a periodic basis and to process the image data to determine two-dimensional foreground region information related to objects in the foreground of the scene which the camera device captures. The thin-client application then sends its two-dimensional foreground region information to server 2. The processing performed by the thin-client application and by server 2 are explained in greater detail below.

Each of camera devices 4 to 7 can capture image data according to various types of camera technology. For example, the camera devices could capture image data using white light, near infrared, or far infrared, depending on the environment in which the camera devices will be operating and on other factors such as expense. Also, each camera device has a local connection interface, such as USB, firewire, serial, etc. for connecting to an external thin-client processor, or to another device if necessary. Each camera device also has a flexible digital resolution so that the file size of the captured image data can be controlled. Server 2 is a conventional network server having a processor, memory and a network interface for communicating with each thin-client processor, whether in a camera device or externally provided via network 1. The processor in server 2 executes an object tracking application, which receives the two-dimensional foreground region information from each of the thin-client processors and creates a three-dimensional volume (visual hull) for each object in the two-dimensional foreground region information. The functionality of the object tracking application executing in server 2 is discussed further below. Based on the foregoing, it can be appreciated that the hardware architecture of the present system uses hardware components which are readily available and which can be easily added to the system, thereby making the object tracking system of the present invention scaleable in an easy and cost effective manner.

Figure 2:
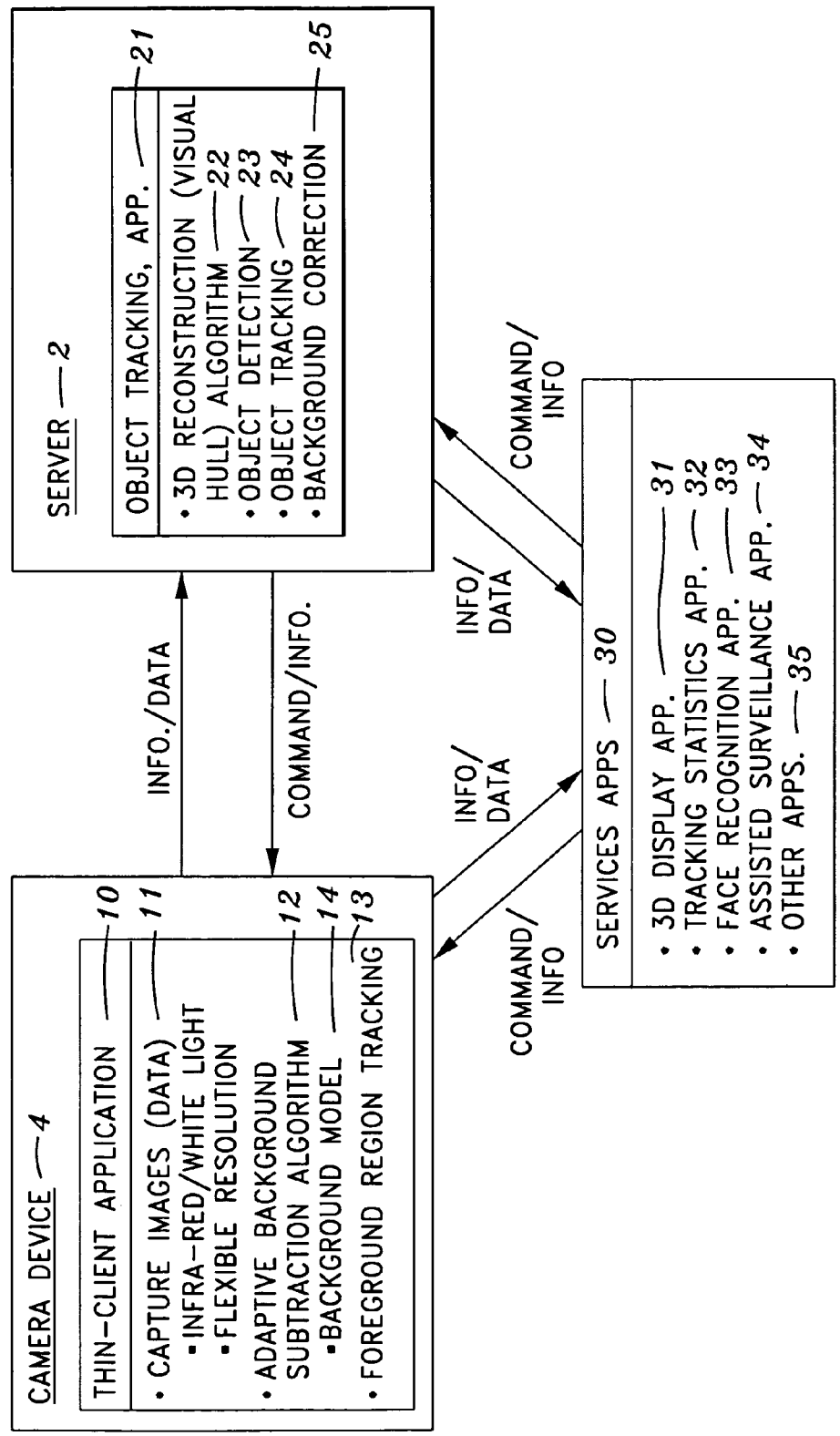
FIG. 2 is a functional block diagram depicting the software components of the object tracking system according to one embodiment of the invention.

FIG. 2 depicts the interaction between the top-level software components of the object tracking system according to one embodiment of the invention. As seen in FIG. 2, camera device 4 is representative of the camera devices in the system, and includes thin-client application 10, which executes either in a thin-client processor in camera device 4, or in an external thin-client processor. Thin-client application 10 processes image data captured by the camera device. Among other detailed functions, thin-client application 10 includes capture image data function 11, adaptive background subtraction algorithm 12, and foreground region tracking 13. Capture image data function 11 is used to control the camera hardware of camera device 4 to capture image data, in either infrared or white light, and with the desired resolution, and then obtain the captured image data for processing. Adaptive background subtraction algorithm 12 takes the captured image data and generates foreground region information based on subtraction of the background image data using background model 14. This functionality is discussed in more detail herein. Foreground region tracking 13 uses two-dimensional object tracking techniques and assigns an identification code to each foreground region being tracked from one captured frame to the next. Thin-client application 10 then sends the foreground region information to server 2.

Returning to server 2, object tracking application 21 receives the foreground region information from all camera devices, and uses the foreground region information to generate three-dimensional volumetric representations of each foreground object represented in the foreground region information. In this regard, object tracking application 21 includes, among other functionality, three-dimensional reconstruction (visual hull) algorithm 22, object detection function 23, object tracking function 24 and background correction function 25. Three-dimensional reconstruction (visual hull) algorithm 22 is used to generate three-dimensional volumetric representations (visual hulls) of each foreground object represented in the foreground region information. Object detection function 23 is used to detect the three-dimensional position of each generated visual hull corresponding to each object, and object tracking function 24 uses three-dimensional motion models to estimate the motion of each tracked visual hull. Background correction 25 sends updated background correction information to each thin-client application 10 corresponding to each of camera devices 4 to 7 in order to update their respective background models 14. The functionality of the aforementioned is discussed in more detail herein.

As seen in FIG. 2, commands and/or information are sent from object tracking application 21 to thin-client application 10 in each thin-client processor (internal or external to each camera device) via network 1. For example, each thin-client application 10 is preferably synchronized and controlled remotely by commands from object tracking application 21. In this manner, object tracking application 21 can command all thin-client applications 10 corresponding to all camera devices to perform processing of image data in a synchronized fashion on a frame-by-frame basis and then send their resulting two-dimensional foreground region information to object tracking application 21 simultaneously via network 1. Object tracking application 21 also sends the background correction information to each thin-client application 10 for each camera device via network 1. In this manner, the thin-client connected camera devices operate in a distributed network and perform image foreground region processing themselves, thereby relieving the computational burden of server 2, which focuses its resources on receiving the foreground region information and generating three-dimensional visual hulls for the foreground objects.

Also shown in FIG. 2 is services applications 30, which can be hosted in server 2, or in another server or computing device that communicates with server 2 and thin-client connected camera devices 4 to 7 via network 1. In this regard, thin-client application 10 and object tracking application 21 represent the functionality of object tracking system according to the present invention, and services applications 30 represents other applications that can use the results from the object tracking system. For example, among other types of services, services applications 30 includes three-dimensional display application 31, tracking statistics application 32, face recognition application 33, assisted surveillance application 34 and other applications 35.

Figure 3:
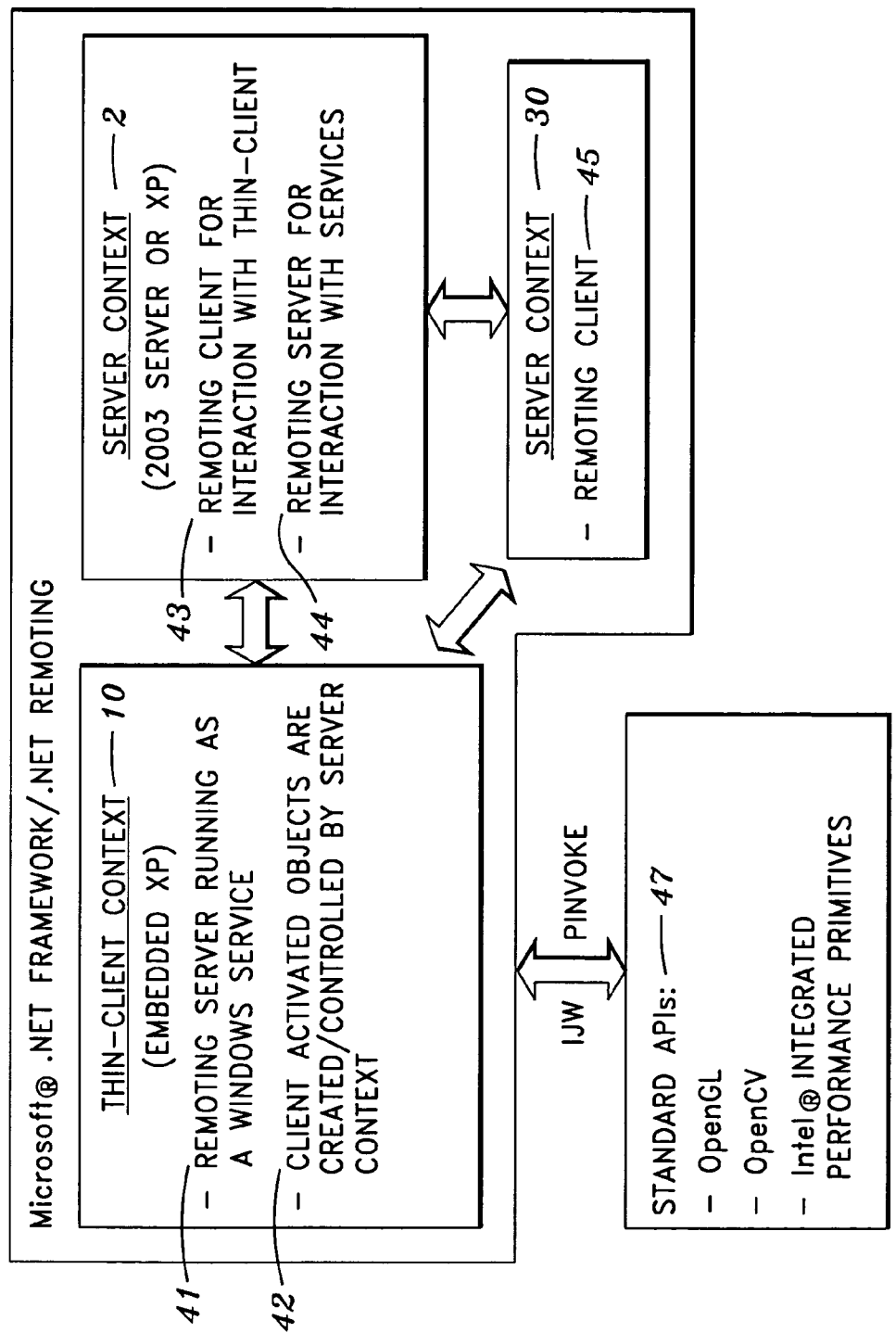
FIG. 3 is a functional block diagram depicting the network architecture of the object tracking system according to one embodiment of the invention.

FIG. 3 depicts the functional network architecture of the object tracking system according to one embodiment of the invention. As seen in FIG. 3, the network components for implementing the object tracking system are shown to be based on a Microsoft®.NET (remoting) framework. Of course, it should be appreciated that other types of network components can be used to implement the present invention, and that the Microsoft®.NET (remoting) framework is shown in FIG. 3 as one example. Returning to FIG. 3, thin-client application 10 is seen to have network functionality based on Embedded XP and includes Remoting Server 41 which allows thin-client application 10 to be accessed and/or controlled by object tracking application 21 in server 2, or another application such as one of services applications 30, via network 1. In this regard, the client-activated objects of thin-client application 10, such as those shown in FIG. 2, are created and/or controlled by object tracking application 21 in server 2.

In the server context of server 2, object tracking application 21 includes Remoting Client 43 for accessing and/or controlling thin-client application 10. In addition, object tracking application 21 includes Remoting Server 44 for interacting with services applications 30. In this regard, services applications 30 includes Remoting Client 45 for interfacing with each thin-client application 10 and with object tracking application 21 in server 2. The software objects of the system can use standard application program interfaces (API), although custom APIs can also be used. In this regard, the types of standard APIs that can be used include OpenGL, OpenCV, Intel® Integrated Performance Primitives. Based on the foregoing, it can appreciated that the use of known network architecture components makes the object tracking system of the present invention easily configurable and scalable.

Figure 4:
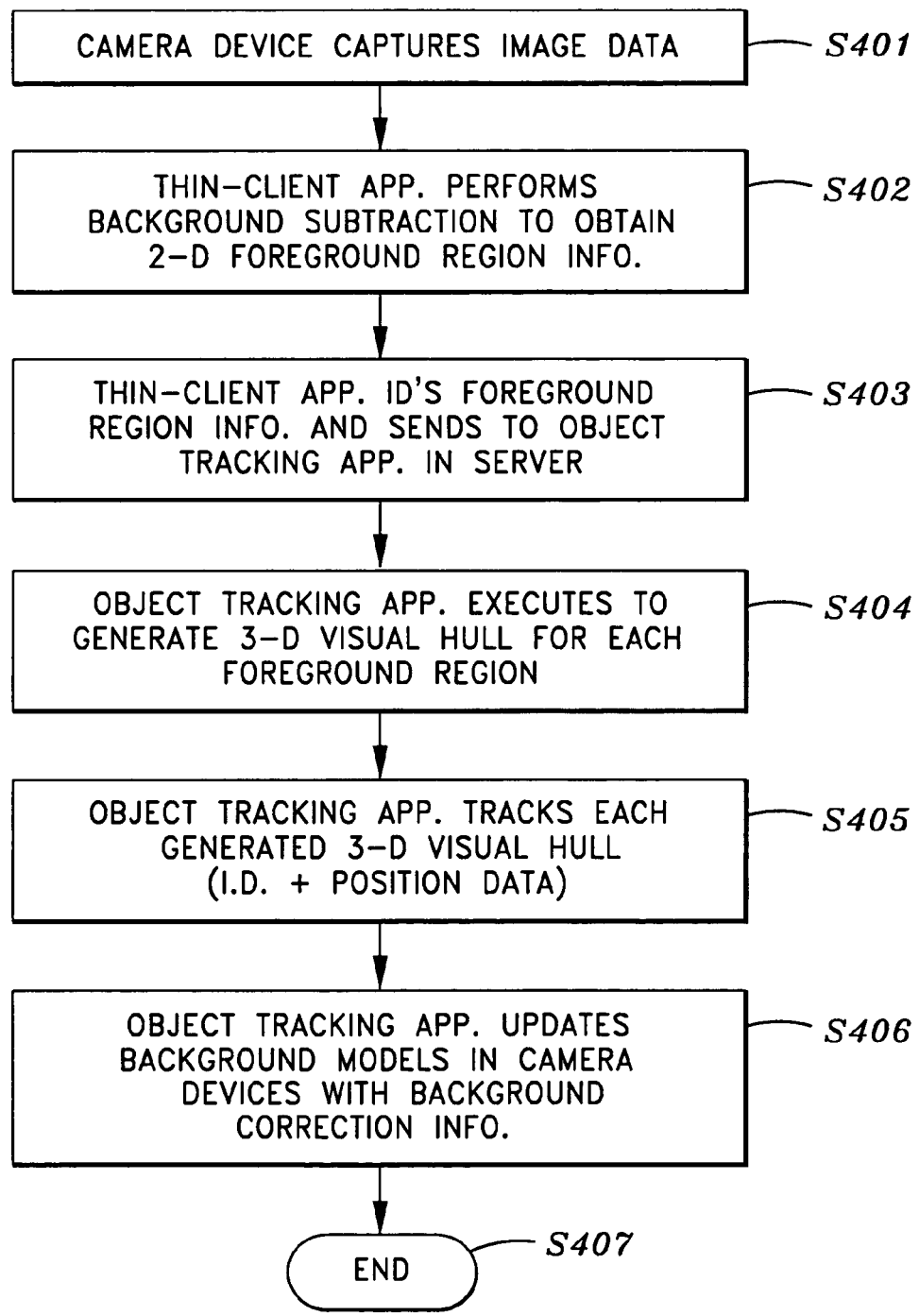
FIG. 4 is a flowchart for explaining the top level functionality of the object tracking system according to one embodiment of the invention.

FIG. 4 is a flowchart which provides a top-level explanation of the functionality of the object tracking system. As seen in step S401 of FIG. 4, the camera device captures image data, preferably in response to a command from its thin-client application 10 which in turn was commanded by object tracking application 21 in server 2. Next, thin-client application 10, executing in a thin-client processor provided in the camera device or externally provided, performs background subtraction using background model 14 to obtain two-dimensional foreground region information. Thin-client application 10 tracks the identification of the foreground regions using two-dimensional object tracking and sends its two-dimensional foreground region information to object tracking application 21 in server 2, along with the region identification information (step S403). In step S404, object tracking application 21 executes and uses the received foreground region information to generate a three-dimensional volumetric representation (visual hull) of each foreground object represented in the foreground region information.

Next, object tracking application 21 identifies and tracks the position and estimated motion of each generated visual hull which represents an object (step S405). Then, object tracking application 21 uses the tracked position and motion of each object to send updated background correction information to each respective camera device (step S406). The updated background correction information is based on illumination changes at the pixel level, such as determining by lack of pixel illumination changes that a previously-moving object has become static. The process ends at step S407. In this manner, the object tracking system of the present invention provides more accurate three-dimensional volumetric tracking of objects based on foreground information from a plurality of thin-client applications connected to camera devices, and distributes the image processing between the thin-clients and the processor in the server.

Figure 5:
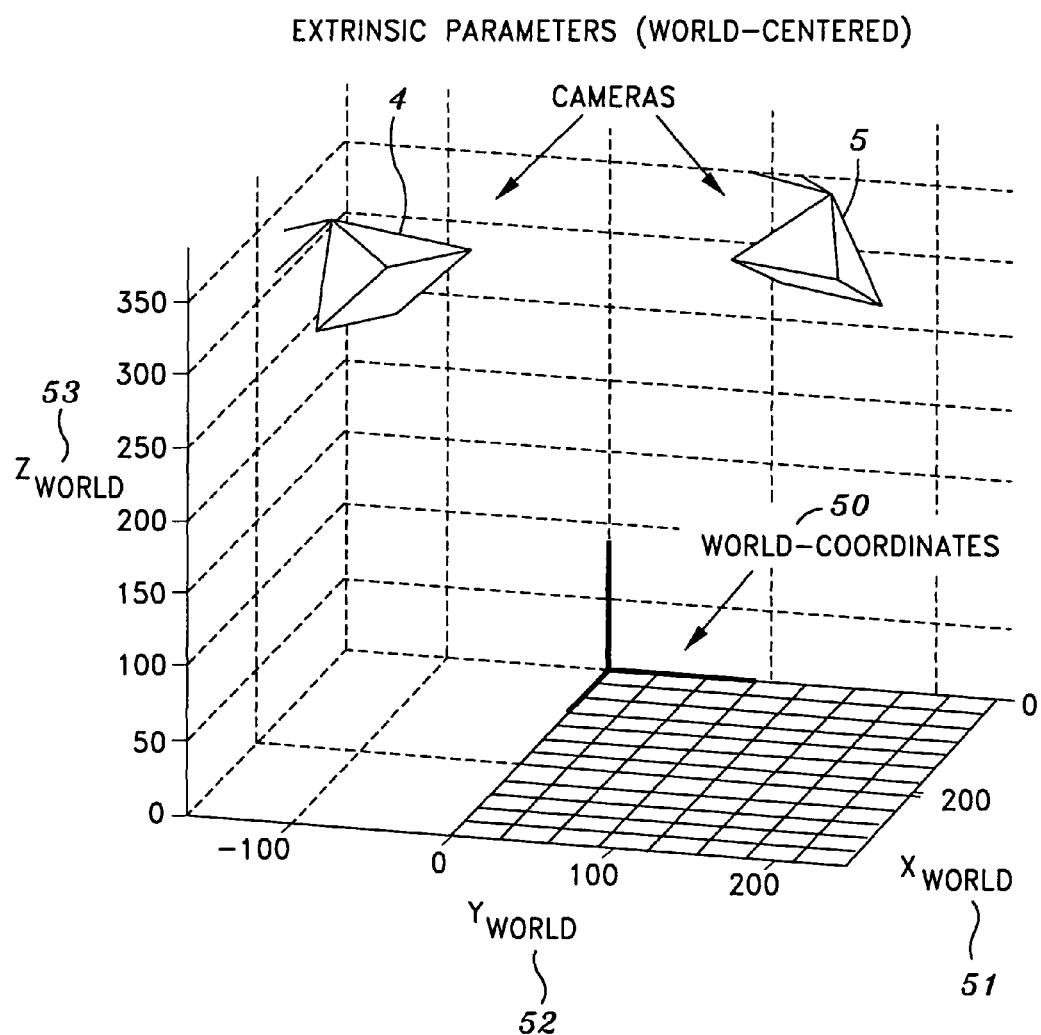
FIG. 5 is a schematic for explaining the extrinsic world coordinate parameters of the camera devices according to one embodiment of the invention.

FIG. 5 depicts the extrinsic world coordinate parameters of the camera devices in the object tracking system. As seen in FIG. 5, camera devices 4 and 5 are shown positioned in an environment, such as an office or a laboratory. In order for object tracking application 21 in server 2 to piece together the two-dimensional foreground information from all thin-client connected camera devices to form a three-dimensional visual hull for each object in the foreground regions, object tracking application 21 must be able to accurately cross-relate the objects in the foreground region information from each thin-client application. So, the camera devices must be referred to in a common coordinate system. FIG. 5 shows how camera devices 4 and 5 relate to each other on world coordinates 50, comprised of Xworld 51, Yworld 52, and Zworld 53 axes. The position of each camera device is preferably provided to its thin-client application 10 and object tracking application 21 in server 2 at the time each camera device is installed in the object tracking system. In the alternative, the world coordinates of each camera device can be sent to object tracking application 21 when thin-client application 10 sends the foreground tracking information to object tracking application 21.

Figure 6:
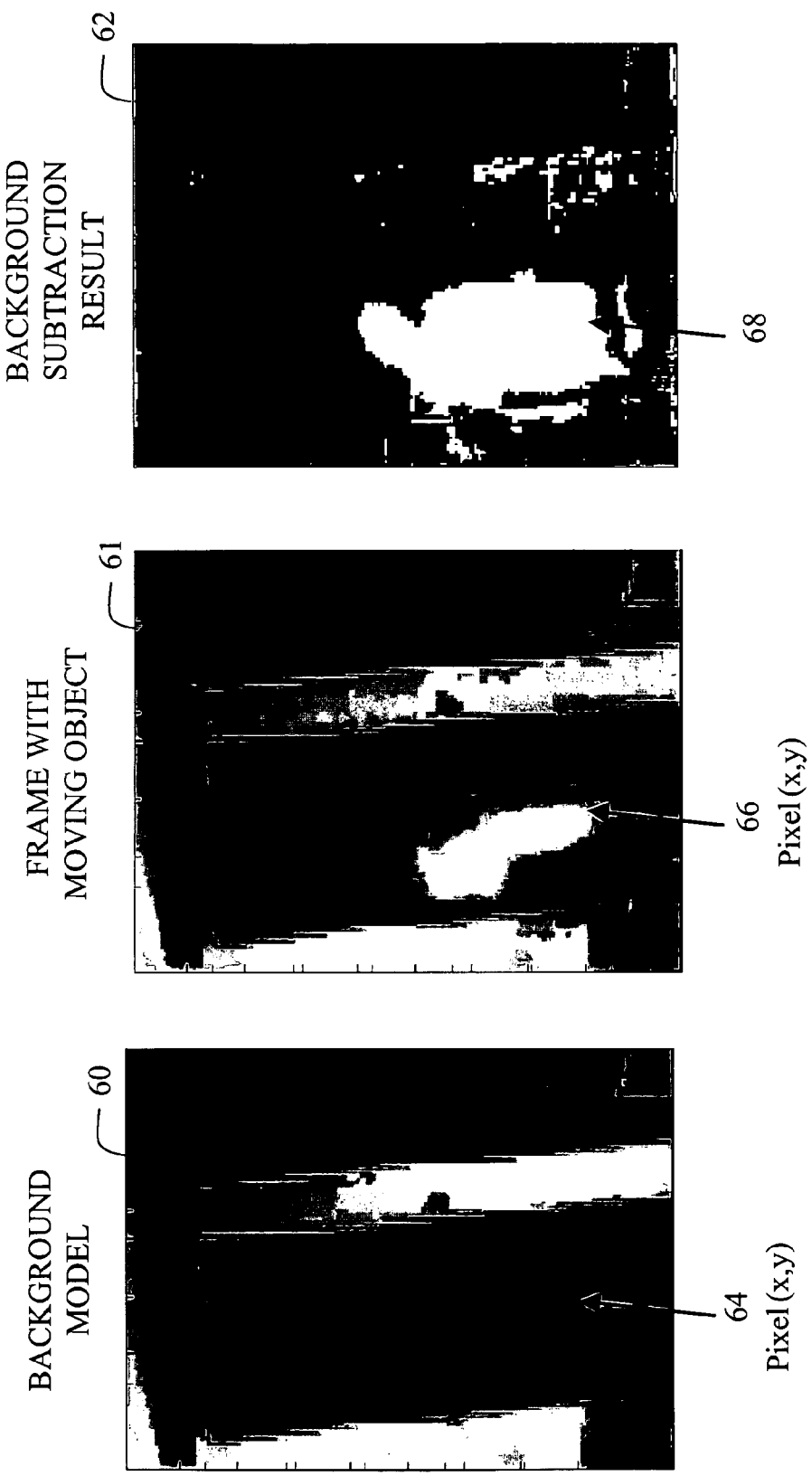
FIG. 6 is a series of frame images depicting background subtraction to obtain foreground regions according to one embodiment of the invention.

FIG. 6 is a series of three frames which depicts adaptive background subtraction algorithm 12 performed by thin-client application 10 in the camera devices. As mentioned above, adaptive background subtraction algorithm 12 obtains the foreground region information from the captured image data by subtracting the background image information based on background model 14. In this regard, background model 14 is preferably periodically updated using an adaptive background estimation algorithm which determines background information at each pixel of the captured image data based on previously-determined foreground region information and based on an illumination level changes at each pixel of the captured image data. The adaptive background estimation algorithm of the thin-client application 10 for each camera device receives the updated background correction information on a periodic basis from object tracking application 21 in server 2. In this manner, objects that become static, (i.e. a ball coming to a stop), are incorporated into the background pixel data of background model 14 for each camera device. This provides for more accurate background subtraction from one frame to the next in the thin-client application for each camera device, which thereby results in more accurate three-dimensional visual hull generation for object tracking in object tracking application 21 of server 2.

Returning to FIG. 6, frame 60 depicts the current background pixel information of background model 14, and a particular pixel 64 is shown as having a dark illumination level. Next, in frame 61, a frame of captured image data having a moving object in the foreground is shown, in which pixel 66, located at the same location as pixel 64 in the background pixel information, has a bright illumination level. Next, frame 62 is shown which is the result of subtracting each pixel of the background pixel information (from background model 14) frame 60 from each corresponding pixel of captured image data of frame 61 based on mean illumination levels of each pixel, and then only showing those pixels represent an illumination level change greater than a predetermined threshold. Thus, only pixels of the captured image having a certain illumination level difference with respect to the background model pixel information data are included in the foreground region information. In this manner, the foreground region information is separated from the captured image data. Thin-client application 10 then sends the two-dimensional foreground region information to object tracking application 21 in server 2. Thin-client application 10 can also compress the foreground region information before sending it to object tracking application 21 for more efficient transfer via network 1. In addition, thin-client application 10 can send video-streams to object tracking application 21 when so commanded. Various types of compression can be used, such as Windows Media® format, and MPEG-II, although other compression techniques can also be used without departing from the functionality of the present invention.

Figure 7:
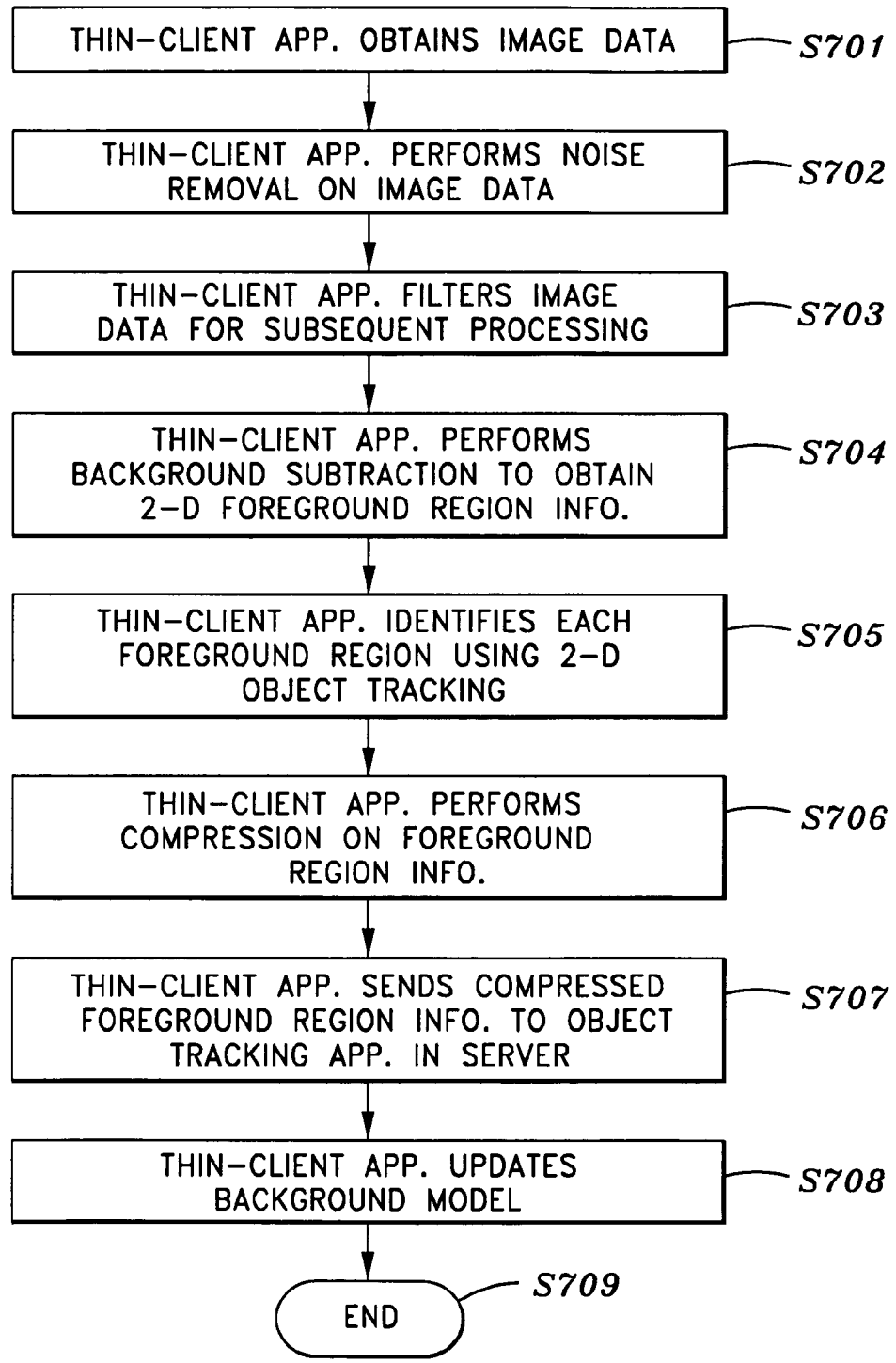
FIG. 7 is a flowchart for explaining the detailed functionality of the thin-client application according to one embodiment of the invention.

FIG. 7 is a flowchart for explaining in more detail the functionality of thin-client application 10. In step S701, thin-client application 10 obtains image data captured by its corresponding camera device. Then, in step S702, thin-client application 10 pre-processes the captured image data by performing noise removal on the captured image data to clean-up erroneous pixel data. The captured image data is then further pre-processed in step S703 by thin-client application 10 which filters the captured image data for improved subsequent processing, for brightness, etc.

In step S704, thin-client application 10 performs background subtraction on the pre-processed captured image data using adaptive background subtraction algorithm 12 based on background model 14, to obtain two-dimensional foreground region information. Thin-client application 10 identifies each foreground region represented in the foreground region information with an identification code in step S705, by using two-dimensional object tracking based on two-dimensional motion models. Next, in step S706, thin-client application 10 performs compression on the foreground region information, and then sends the compressed foreground region information to object tracking application 21 in server 2 (step S707).

Then, in step S708, thin-client application 10 updates background model 14 using an adaptive background estimation algorithm based on updated object position, illumination level changes, and updated background correction information received from object tracking application 21. The process then ends in step S709. Preferably, the foregoing steps of FIG. 7 are triggered in thin-client application 10 by receiving a synchronization command from object tracking application 21 so that all camera devices in the object tracking system capture an image, process it, and send their respective foreground information to object tracking application 21 at the same time. In this manner, object tracking application 21 in server 2 can collectively process all received foreground region information to determine three-dimensional visual hulls for each detected foreground object.

Figure 8:
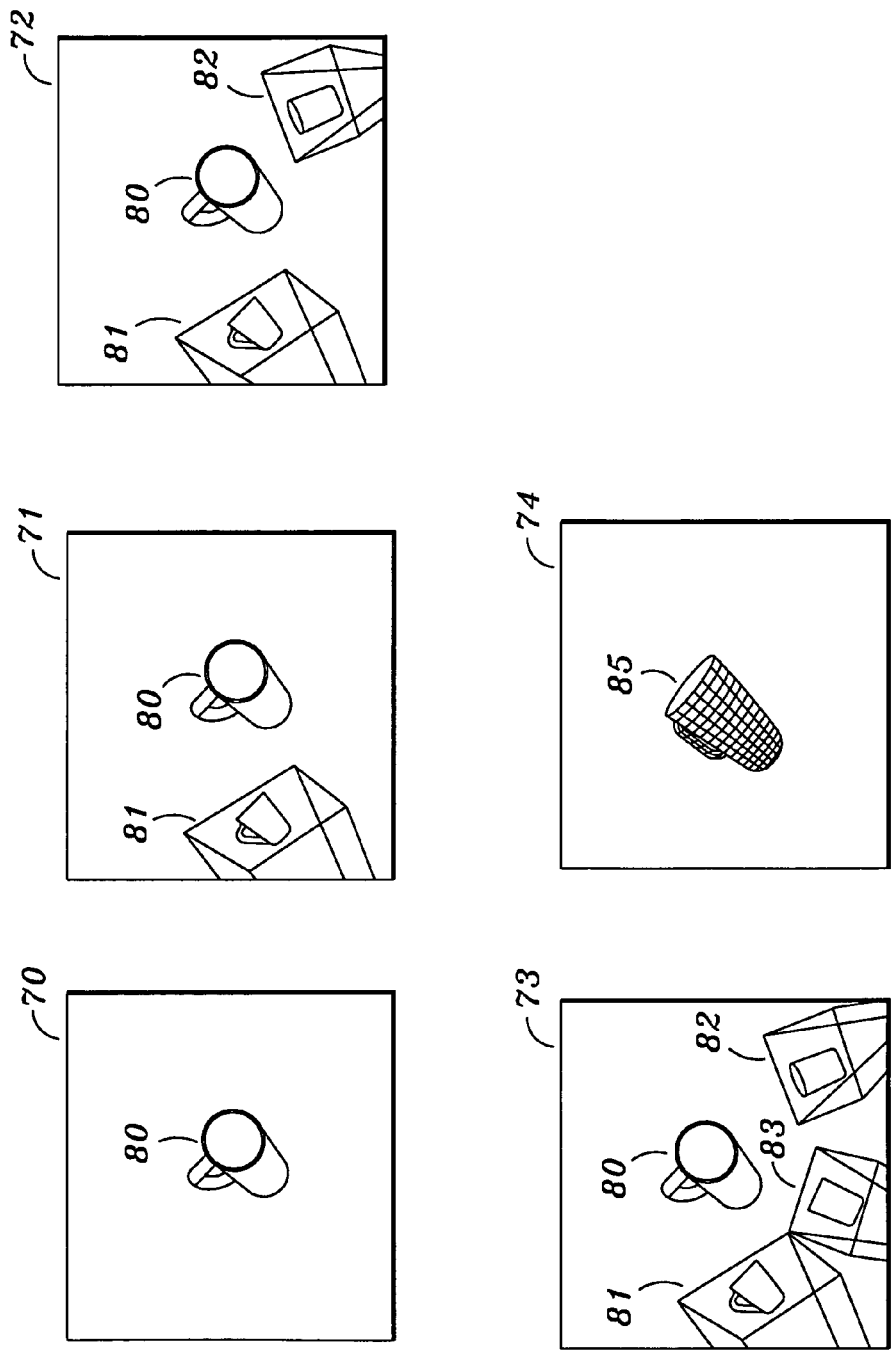
FIG. 8 is a series of frames depicting the visual hull volume reconstruction of a foreground object according to one embodiment of the invention.

FIG. 8 depicts, through a series of frames, the generation of a three-dimensional visual hull for a detected foreground object based on the foreground region information received from thin-client applications for three different camera devices. First, in frame 70, coffee mug 80 is shown in the environment which is covered by three separate camera devices. Next, in frame 71, a first foreground region information showing two-dimensional foreground 81 of coffee mug 80 is shown. In frame 72, a second foreground region information showing two-dimensional foreground 82 of coffee mug 80 from a different camera angle is added. Similarly, frame 73 adds a third foreground region information showing two-dimensional foreground 83 of coffee mug 80 from yet another camera angle. Three-dimensional reconstruction algorithm 22 then generates geometric, volume-based three-dimensional visual hull 85 based on the three different sets of foreground region information as viewed from three separate camera devices and processed by their respective thin-client applications, thereby providing dimensions of coffee mug 80 in three-dimensional space.

Figure 9:
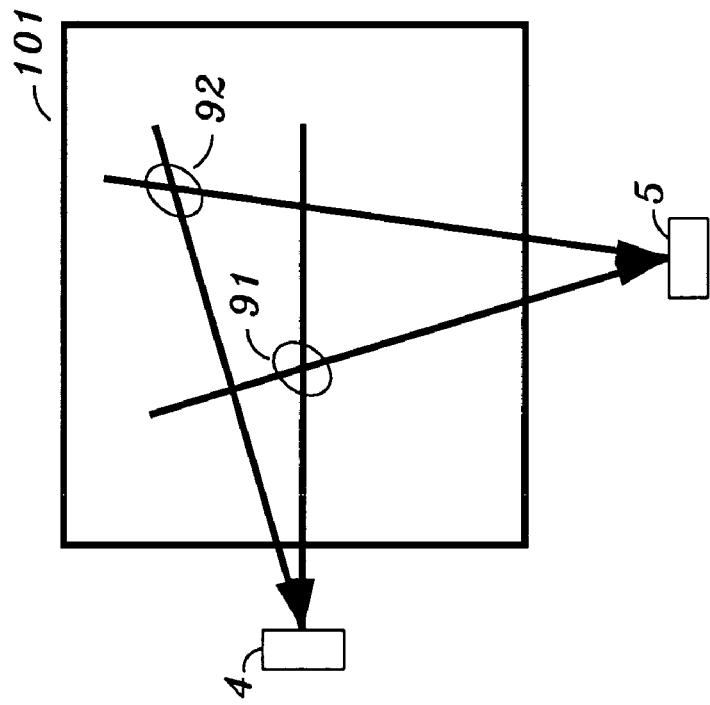
FIG. 9 is a schematic for explaining the determination of object positions for the generated visual hulls using two-dimensional tracking according to one embodiment of the invention.
Figure 9:
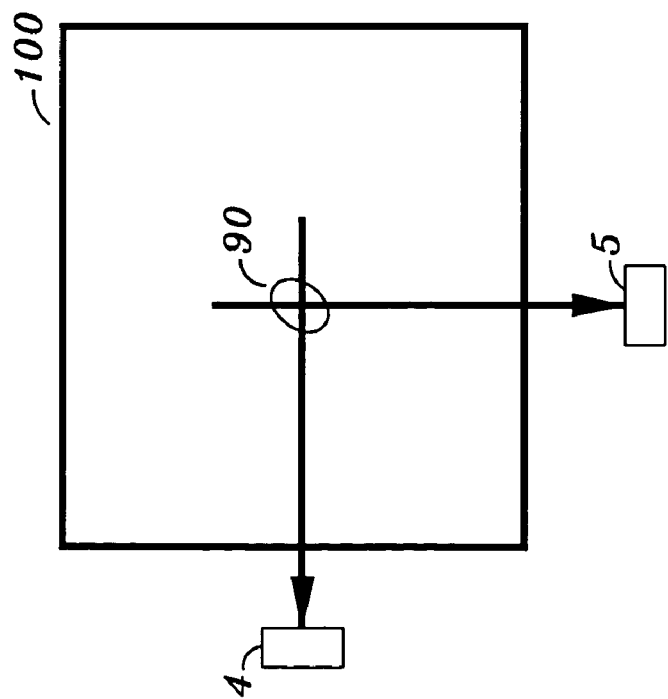

FIG. 9 depicts object tracking performed to detect each object location based on the generated visual hulls by object detection function 23. For example, in frame 100 in FIG. 9, foreground region information from camera devices 4 and 5 show that visual hull 90 is received in their respective foreground regions. The two-dimensional position data, in a common coordinate system, for visual hull 90 is provided from camera devices 4 and 5 to object tracking application 21 in server 2 along with the foreground region information. Accordingly, the intersection of the two-dimensional position data from camera devices 4 and 5 provides the three-dimensional position of the visual hull 90. Similarly, frame 101 of FIG. 9 depicts a scenario in which foreground region information from camera devices 4 and 5 show that visual hull 91 and visual hull 92 are received in their foregrounds. Accordingly, the intersection of the two-dimensional position data from camera devices 4 and 5 provides the three-dimensional positions of visual hulls 91 and 92, respectively. Once the positions of the generated visual hulls are determined, their identities can be tracked based on previously tracked objects, and their respective three-dimensional motions can be estimated using known motion models.

Figure 10:
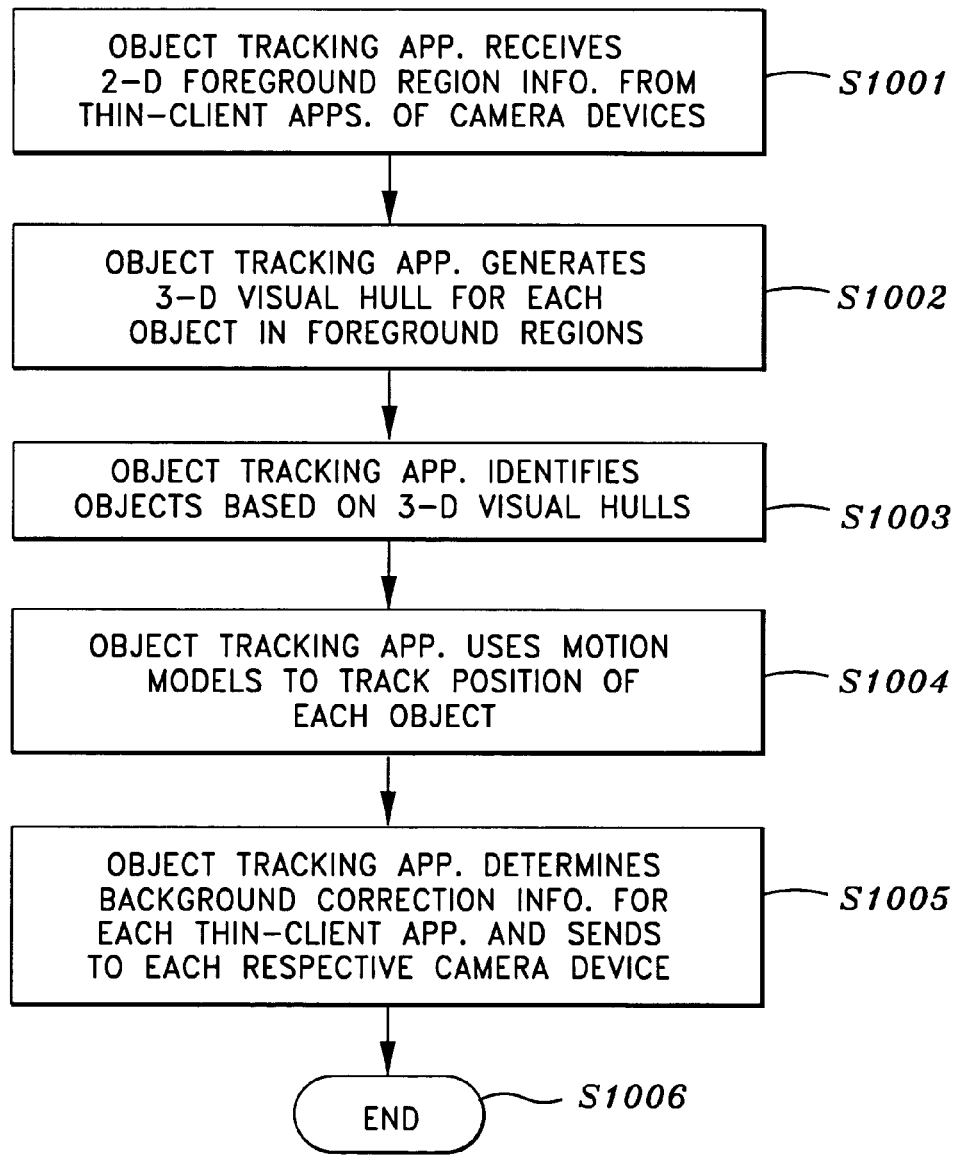
FIG. 10 is a flowchart for explaining the detailed functionality of the object tracking application in the server according to one embodiment of the invention.

FIG. 10 is a flowchart which explains the functionality of object tracking application 21 in server 2 in greater detail. In step S1001, object tracking application 21 receives two-dimensional foreground region information from the thin-client application for each camera device, including two-dimensional object position data for each object identified in the foreground region information by the thin-client application. Then, in step S1002, object tracking application 21 uses three-dimensional reconstruction algorithm 22 to generate a three-dimensional visual hull for each foreground object represented in the received foreground region information. In step S1003, object tracking application 21 identifies each generated visual hull as either a new object or as a previously-tracked object based on the two-dimensional position information received from the thin-client applications, and object tracking application 21 then estimates a current position of each identified object. The three-dimensional position data is used to update three-dimensional motion models for each object to represent its current motion parameters in step S1004. In step S1005, object tracking application 21 determines and sends background correction information for each thin-client application 10 for each camera device based on tracked objects which have turned static, and on removal of noise zones according to tracked object position and motion data. The process then ends at step S1006. In this manner, the object tracking application 21 more accurately represents foreground objects by generating a three-dimensional hull for each object, thereby resulting in more accurate object identification, position estimation, and motion modeling.

Figure 11A:
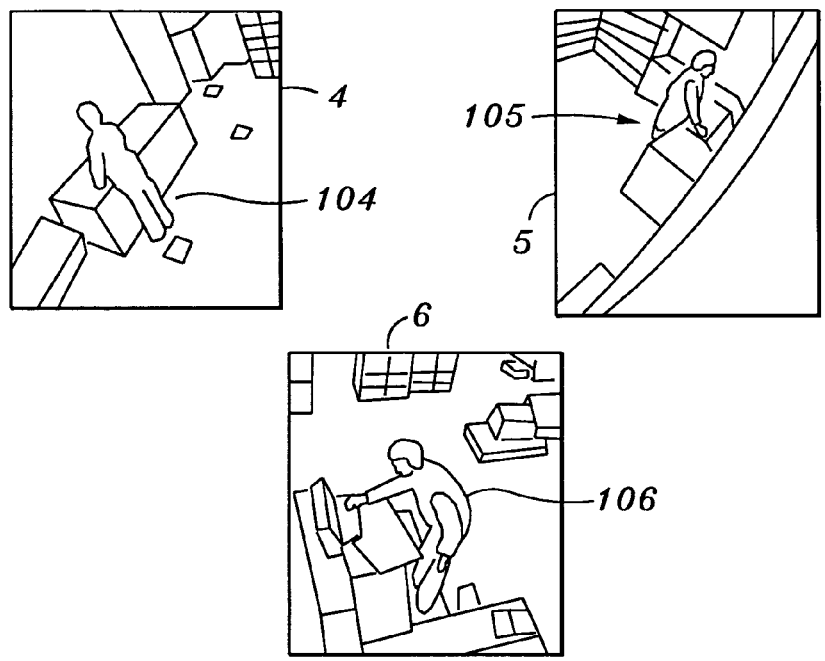
FIGS. 11A and 11B are a series of frames for explaining a three-dimensional service application according to one embodiment of the invention.
Figure 11B:
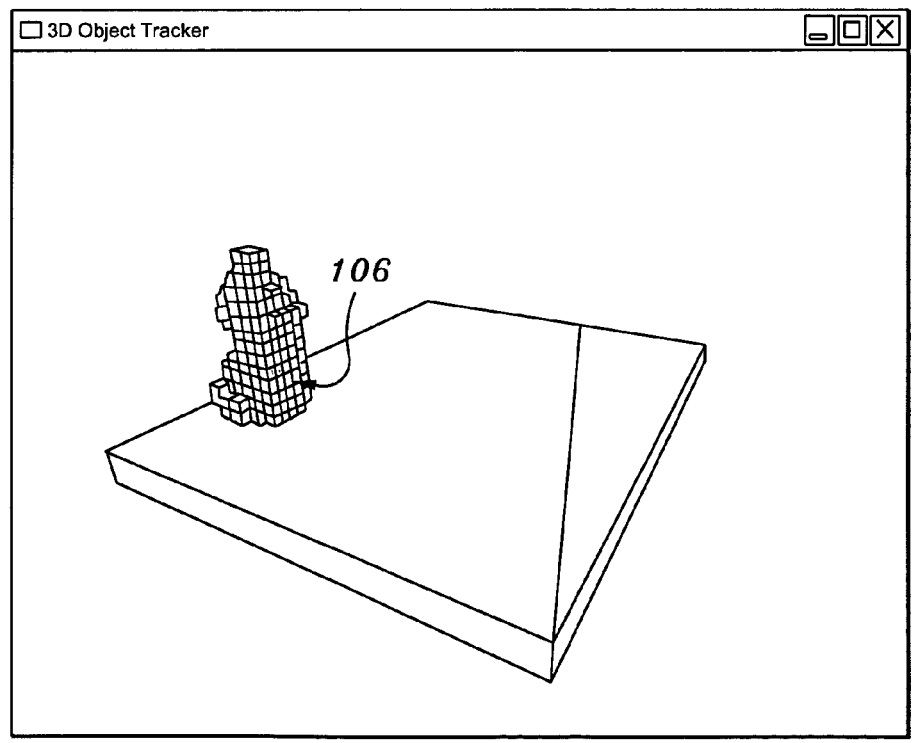

As mentioned above, services applications 30 includes applications that use the object identification, position and motion data generated by the object tracking system. In this regard, FIGS. 11A and 11B represent one such service application, which is three-dimensional display application 31. As seen in FIG. 11A, camera devices 4, 5 and 6 capture image data of a scene, which is a man in an office space. The pixel data of the man is subtracted from the static background according to the thin-client application 10 of the present invention, to generate foreground regions 104, 105 and 106, respectively. The object tracking application 21 of the present invention generates a visual hull based on foreground regions 104, 105 and 106 according to the method described above. FIG. 11B depicts a display screen-shot generated by three-dimensional display application 31. As seen in FIG. 11B, the generated visual hull that corresponds to the man in FIG. 11A is represented in three-dimensional space in a position relative to the dimensions of the office space. In this manner, the position and motion data of the generated visual hull is used to depict the position and motion of the "visual hull" man represented in the display created by three-dimensional display application 31. Of course, this is just one example of services applications 30, and it can be appreciated that many other types of applications can use and interact with the object tracking system of the present invention.

Based on the foregoing invention, objects can be tracked in three-dimensional space in a more reliable and efficient manner. Specifically, a more accurate three-dimensional volumetric visual hull corresponding to each object is determined and tracked. In addition, phantom objects and other artifacts are reduced through the use of two-dimensional object tracking at the thin-client and a smart server application that takes into account past positions of tracked objects. The present invention also reliably tracks multiple objects through the use of multiple cameras from different angles, thereby providing more reliable collective foreground data from which to generate visual hulls. Finally, the present invention operates in a distributed fashion, thereby significantly reducing processing overhead at the server, and allowing for scalability through the addition of distributed thin-client connected camera devices.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for tracking objects, the method comprising the steps of:
   capturing image data at each of a plurality of camera devices;
   processing, in each of a plurality of thin-client processors, the image data to obtain two-dimensional foreground region information by using a background subtraction algorithm, wherein the processing comprises determining background information at each pixel of the image data based on previously-determined foreground region information, and wherein the background subtraction algorithm determines foreground region information for each foreground region in the image data that corresponds to an object and uses a background model to separate the foreground region information for each foreground region from the image data;

facilitating sending of the two-dimensional foreground region information to an apparatus having a processor configured to generate a three-dimensional visual hull;

receiving, in each of the plurality of thin-client processors from the apparatus, background correction information that is generated by the apparatus based on the three-dimensional visual hull; and updating the background model based on previously-determined foreground region information and an illumination level change, and based on the background correction information received from the apparatus having the processor configured to generate the three-dimensional visual hull.

2. The method according to claim 1, wherein the background model is updated with the background correction information from the apparatus, wherein the background correction information corresponds to a respective camera device.

3. The method according to claim 1, wherein the two-dimensional foreground region information includes an identification code corresponding to each foreground region in the image data.

4. The method according to claim 1, wherein each of the plurality of thin-client processors is remotely controlled and synchronized by the processor of the apparatus.

5. The method according to claim 4, wherein, in the sending step, the two-dimensional foreground region information is sent to the apparatus from each of the plurality of thin-client processors in response to a request command from the apparatus.

6. The method according to claim 1, further comprising: generating each three-dimensional visual hull by using a volume reconstruction algorithm which reconstructs a volume for each foreground region represented in the two-dimensional foreground region information from the plurality of thin-client processors.

7. The method according to claim 1, wherein at least one of the plurality of thin-client processors is disposed within the corresponding camera device.

8. The method according to claim 1, further comprising: tracking, at each of the plurality of thin-client processors, each foreground region from one frame to a next frame using two-dimensional object tracking based on two-dimensional motion models.

9. The method according to claim 1, wherein the two-dimensional foreground region information sent to the apparatus comprises two-dimensional object position data.

10. The method according to claim 1, wherein the foreground region information comprises only pixels of the image data having an illumination level change greater than a predetermined threshold, wherein updating the background model based on previously-determined foreground region information and an illumination level change, and based on the background correction information received from the apparatus having the processor configured to generate the three-dimensional visual hull comprises:

updating the background model periodically using an adaptive background estimation algorithm which determines background information at each pixel of the image data based on previously-determined foreground region information and based on an illumination level change at each pixel of the image data and using the adaptive background estimation algorithm based on the background correction information received from the apparatus having the processor configured to generate the three-dimensional visual hull.

11. A non-transitory computer-readable medium encoded with a computer program for processing image data, the computer program comprising code for:

receiving image data;

processing the image data to obtain two-dimensional foreground region information from the image data using a background subtraction algorithm, wherein the processing comprises determining background information at each pixel of the image data based on previously-determined foreground region information, and wherein the background subtraction algorithm determines foreground region information for each foreground region in the image data that corresponds to an object and uses a background model to separate the foreground region information for each foreground region from the image data;

facilitating sending of the two-dimensional foreground region information to an apparatus configured to generate a three-dimensional visual hull;

receiving, in a processor from the apparatus, background correction information that is generated by the apparatus based on the three-dimensional visual hull; and updating the background model based on previously-determined foreground region information and an illumination level change, and based on the background correction information received from the apparatus having the processor configured to generate the three-dimensional visual hull.

12. An object tracking system, comprising:

a plurality of thin-client processors, each of the plurality of thin client processors configured to receive image data and configured to process the image data to obtain two-dimensional foreground region information by using a background subtraction algorithm in which background information at each pixel of the image data is determined based on previously-determined foreground region information, foreground region information is determined for each foreground region in the image data that corresponds to an object, and a background model is used to separate the foreground region information for each foreground region from the image data, the plurality of thin-client processors configured to facilitate sending of the two-dimensional foreground region information to an apparatus having a processor configured to generate a three-dimensional visual hull, each of the plurality of thin-client processors configured to receive, from the apparatus, background correction information that is generated by the apparatus based on the three-dimensional visual hull, each of the plurality of thin-client processors configured to update the background model based on previously-determined foreground region information and an illumination level change, and based on the background correction information received from the apparatus having the processor configured to generate the three-dimensional visual hull.

13. The object tracking system according to claim 12, further comprising a plurality of camera devices configured to capture the image data, wherein the background model is configured to be updated with the background correction information received from the apparatus, wherein the background correction information corresponds to a respective camera device.

14. The object tracking system according to claim 12, wherein the two-dimensional foreground region information includes an identification code corresponding to each foreground region in the image data.

15. The object tracking system according to claim 12, wherein each of the plurality of thin-client processors is remotely controlled and synchronized by the processor of the apparatus.

16. The object tracking system according to claim 12, wherein each of the plurality of thin-client processors is configured to send the two-dimensional foreground region information to the apparatus in response to a request command received from the apparatus.

17. The object tracking system according to claim 12, further comprising the apparatus having the processor, wherein the processor is configured to generate a three-dimensional visual hull corresponding to each foreground region represented in the two-dimensional foreground region information, wherein the processor is configured to generate each three-dimensional visual hull by using a volume reconstruction algorithm which reconstructs a volume for each foreground region represented in the two-dimensional foreground region information from the plurality of thin-client processors, wherein the processor is configured to generate identification and position data corresponding to each three-dimensional visual hull.

18. The object tracking system according to claim 12, further comprising a plurality of camera devices configured to capture the image data, each of the plurality of thin-client processors connected to a respective one of the plurality of camera devices via a local connection, wherein at least one of the plurality of thin-client processors is disposed within the corresponding camera device.

19. The object tracking system according to claim 12, wherein each of the plurality of thin-client processors is configured to track each foreground region from one frame to a next frame using two-dimensional object tracking based on two-dimensional motion models.

20. The object tracking system according to claim 12, wherein the two-dimensional foreground region information sent to the apparatus comprises two-dimensional object position data.

21. The object tracking system according to claim 12, wherein the foreground region information comprises only pixels of the image data having an illumination level change greater than a predetermined threshold, wherein each of the plurality of thin-client processors configured to update the background model periodically using an adaptive background estimation algorithm which determines background information at each pixel of the image data based on previously-determined foreground region information and based on an illumination level change at each pixel of the image data and using the adaptive background estimation algorithm based on the background correction information received from the apparatus having the processor configured to generate the three-dimensional visual hull.

\* \* \* \* \*